W. P. BARTEL.
RIVET.
APPLICATION FILED OCT. 14, 1908.

938,812.

Patented Nov. 2, 1909.

Witnesses:
Sydney E. Taft.
Franklin E. Low.

Inventor:
William P. Bartel
by his attorney, Charles S. Gooding.

UNITED STATES PATENT OFFICE.

WILLIAM P. BARTEL, OF WALTHAM, MASSACHUSETTS, ASSIGNOR TO JUDSON L. THOMSON M'FG. CO., A CORPORATION OF MAINE.

RIVET.

938,812. Specification of Letters Patent. Patented Nov. 2, 1909.

Application filed October 14, 1908. Serial No. 457,646.

*To all whom it may concern:*

Be it known that I, WILLIAM P. BARTEL, a citizen of the United States, residing at Waltham, in the county of Middlesex and State of Massachusetts, have invented new and useful Improvements in Rivets, of which the following is a specification.

The object of this invention is to provide a two-part rivet consisting, namely, of a head and a shank, the head being preferably hardened, and the two parts being very firmly attached one to the other.

The rivet is intended to be used in automobile tires to prevent skidding and in such use the wear upon the upper surface of the head is very great and the lateral strain which is brought to bear upon the head and stem, tending to work the head loose upon the stem, is also very great. It is, therefore, very desirable that the surface of the hardened metal forming the head of the rivet should be as large as possible, so that the rivet will wear for a long period. It is also very desirable that the stem portion of the rivet should be large, while that portion of the shank forming the head shall be as small as possible consistent with the necessary strength, and in order to arrive at these results in the completed rivet I have formed and constructed the same as hereinafter described.

The invention consists in a two-part rivet constructed as hereinafter described and particularly as set forth in the claims.

Figure 1:
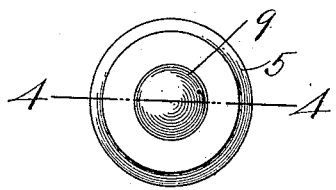
Figure 2:
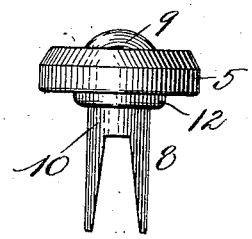
Figure 3:
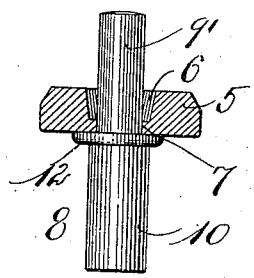
Figure 4:
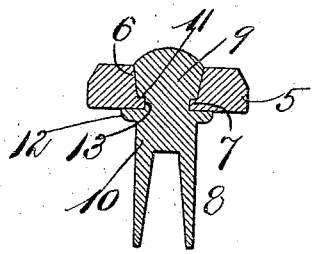
Figure 5:
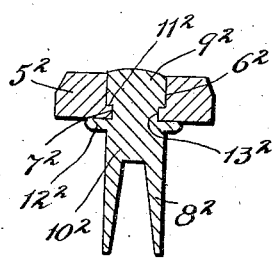

Referring to the drawings: Figure 1 is a plan view of my improved rivet enlarged. Fig. 2 is a front elevation of the same. Fig. 3 is a side elevation of the rivet shank, with the head of the rivet shown in section in position upon the rivet shank for the upper portion of the stem to be upset to form a head thereon. Fig. 4 is a central section taken through line 4—4 of Fig. 1. Fig. 5 is a central section similar to Fig. 4 illustrating a modified form of my invention.

Like numerals refer to like parts throughout the several views of the drawings.

In the drawings Figs. 1 to 4 inclusive, 5 is the head of the rivet consisting of a disk of metal which is preferably hardened and has therein a conical hole 6 at the bottom of which is an annular flange 7. The shank 8 consists of a conical top 9 and a stem 10. The conical top 9 fits in the conical hole 6 in the head 5 and said conical top or head of the shank portion of the rivet terminates at its lower end in a shoulder 11 which rests upon the upper side of the flange 7.

The stem 10 has an annular flange 12 thereon which is located immediately beneath and in contact with the annular flange 7 on the head 5, whereby an annular groove 13 is provided between the shoulder 11 and the flange 12, into which groove the annular flange 7 upon the head 5 projects. It will be seen by observation that the diameter of the shank at the bottom of the groove 13 is substantially less than the diameter of the stem portion 10 of said shank, so that the sides of the conical head 9 of the shank may form a practical angle, and as the head 5 wears away, this conical head 9 will still hold the head 5 upon its shank. Moreover, the flange 12 forms a very strong locking means to prevent any rocking of the head upon the shank of the rivet. It will thus be seen that the head 5, together with the conical head 9, must both wear down to the shoulder 11 before the head 5 can become detached from the rivet shank 8.

By reducing the diameter of the upper portion 9′ of the shank 8, as illustrated in Fig. 3, it will be seen that the conical top 9 of the rivet shank does not take up much of the wearing surface of the head 5, so that by the construction hereinbefore described, we get not only a strong rivet, with the parts very rigidly united against either lateral or longitudinal strain, but the head portion of the rivet presents a large wearing surface in proportion to the diameter of the stem portion 10 of the shank of said rivet.

For the particular purpose hereinbefore set forth of a rivet for automobile tires to prevent skidding, the conical formation of the recess 6 and the conical formation of the top of the shank which fits therein is desirable, but in many cases it may not be necessary that such conical formation should be employed, and in such cases the top 9 of the shank could be cylindrical, but would still be shouldered at 11 and the annular flange 7 would still project into the annular groove 13, whereby the shank and the head would be firmly locked together, but that portion of the top of the head above the flange 7 would be cylindrical as hereinafter described and illustrated in Fig. 5. I, therefore, do not wish to limit my invention to a rivet having a shank with a conical top fitting in a conical hole in the head, the important part of the invention residing in the flange 7 upon the head projecting into the annular groove 13 in the shank between the shoulder 11 and the annular flange 12. In some cases the head 5 might be very large in proportion to the shank of the rivet and where used for ornamental purposes the diameter of the head portion 9 of the shank might be as large or even larger than the diameter of the portion 10 thereof, in which case said portion 10 would be cylindrical instead of conical, as hereinbefore described.

In the modified form of my invention hereinbefore referred to and illustrated in Fig. 5, $5^2$ is the head of the rivet having therein a hole, $6^2$, at the bottom of which is an annular flange $7^2$. The shank $8^2$ consists of a top $9^2$ and a stem $10^2$. The top $9^2$ fits in the hole $6^2$ in the head $5^2$ and said top or head of the shank portion of the rivet terminates at its lower end in a shoulder $11^2$ which rests upon the upper side of the flange $7^2$. The stem $10^2$ has an annular flange $12^2$ thereon which is located immediately beneath and in contact with the annular flange $7^2$ on the head $5^2$ whereby an annular groove $13^2$ is provided between the shoulder $11^2$ and the flange $12^2$ into which groove the annular flange $7^2$ upon the head $5^2$ projects. It will be seen that in this form of my invention as in the form illustrated in Figs. 1 to 4 inclusive the head $5^2$ is held firmly upon the shank until the head $9^2$ of the shank has worn down to the shoulder $11^2$.

Having thus described my invention, what I claim and desire by Letters Patent to secure is:

1. A two-part rivet consisting of a head and a shank, said shank having at one end a conical top terminating at its lower end in a shoulder and an annular flange thereon located beneath said shoulder, whereby an annular groove is formed between said shoulder and flange, said head having a conical hole therein with an annular flange at the bottom thereof, the conical top of said shank fitting in said conical hole and the annular flange on said head fitting in said annular groove.

2. A two-part rivet comprising a head and a shank, said shank consisting of a stem with a conical head at one end thereof terminating at its lower end in a shoulder and an annular flange on said stem beneath said shoulder, whereby an annular groove is formed between said shoulder and flange, said head having a conical hole therein, with an annular flange at the bottom thereof, the conical head of said shank fitting in said conical hole and the annular flange on said head fitting in said groove, the diameter of said shank at the bottom of said groove being substantially less than the diameter of said stem.

3. A two-part rivet consisting of a head and a shank, said shank having at one end a top terminating at its lower end in a shoulder and an annular flange thereon located beneath said shoulder, whereby an annular groove is formed between said shoulder and flange, said head having a hole therein with an annular flange at the bottom thereof, said top of said shank fitting in said hole and said annular flange on said head fitting in said annular groove.

In testimony whereof I have hereunto set my hand in presence of two subscribing witnesses.

WILLIAM P. BARTEL.

Witnesses:
CHARLES S. GOODING,
LOUIS A. JONES.